United States Patent [19]
Johnson

[11] Patent Number: 5,893,683
[45] Date of Patent: Apr. 13, 1999

[54] INDEXABLE INSERT ROUTER

[75] Inventor: William B. Johnson, Rockford, Ill.

[73] Assignee: Ingersoll Cutting Tool Company, Rockford, Ill.

[21] Appl. No.: 08/841,261

[22] Filed: Apr. 29, 1997

[51] Int. Cl.$^6$ ........................................... B23C 5/20
[52] U.S. Cl. ........................... 407/42; 407/53; 407/54; 407/113
[58] Field of Search ................... 407/42, 35, 43, 407/46, 47, 48, 53, 54, 62, 61, 113, 114

[56] References Cited

U.S. PATENT DOCUMENTS

| | | |
|---|---|---|
| 1,460,030 | 6/1923 | Mattson . |
| 4,315,706 | 2/1982 | Erkfritz . |
| 4,396,315 | 8/1983 | Middleton ............... 407/113 X |
| 4,525,110 | 6/1985 | Stojanovski . |
| 4,693,641 | 9/1987 | Tsujimura et al. ............. 407/53 X |
| 4,940,369 | 7/1990 | Aebi et al. . |
| 4,946,318 | 8/1990 | David et al. ............... 407/42 |
| 5,236,288 | 8/1993 | Flueckiger . |
| 5,486,073 | 1/1996 | Satran et al. ............... 407/113 |
| 5,593,255 | 1/1997 | Satran et al. . |

FOREIGN PATENT DOCUMENTS 2190863  12/1987  United Kingdom .

OTHER PUBLICATIONS

Sandvik Catalog CMP–95R, "Rotating Tools and Inserts", cover page, table of contents, and pp. 204–206 inclusive.
Kennametal Catalog 5040, "Milling", cover page, and pp. 231–236 inclusive.
Metal Cutting Principles, Second Edition (Revised), "End Mills", Copyright 1962 by Ingersoll Cutting Tool Company, pp. 24–25.

*Primary Examiner*—William Briggs
*Assistant Examiner*—Henry W. H. Tsai
*Attorney, Agent, or Firm*—Fitch, Even, Tabin & Flannery

[57] ABSTRACT

A high-speed end-milling router for ramping entry into a workpiece has plate-like hard metal cutting inserts fitted in pockets milled in chip gullet surfaces to present the insert at a desired axial rake angle and with radially inwardly and outwardly facing cutting edges. Each insert is secured in its pocket by two countersink headed machine screws whose holding power against centrifugal dislodgement of the insert is reinforced by a projection from the seating surface of the pocket extending into a blind recess molded in the under-surface of the insert.

6 Claims, 1 Drawing Sheet

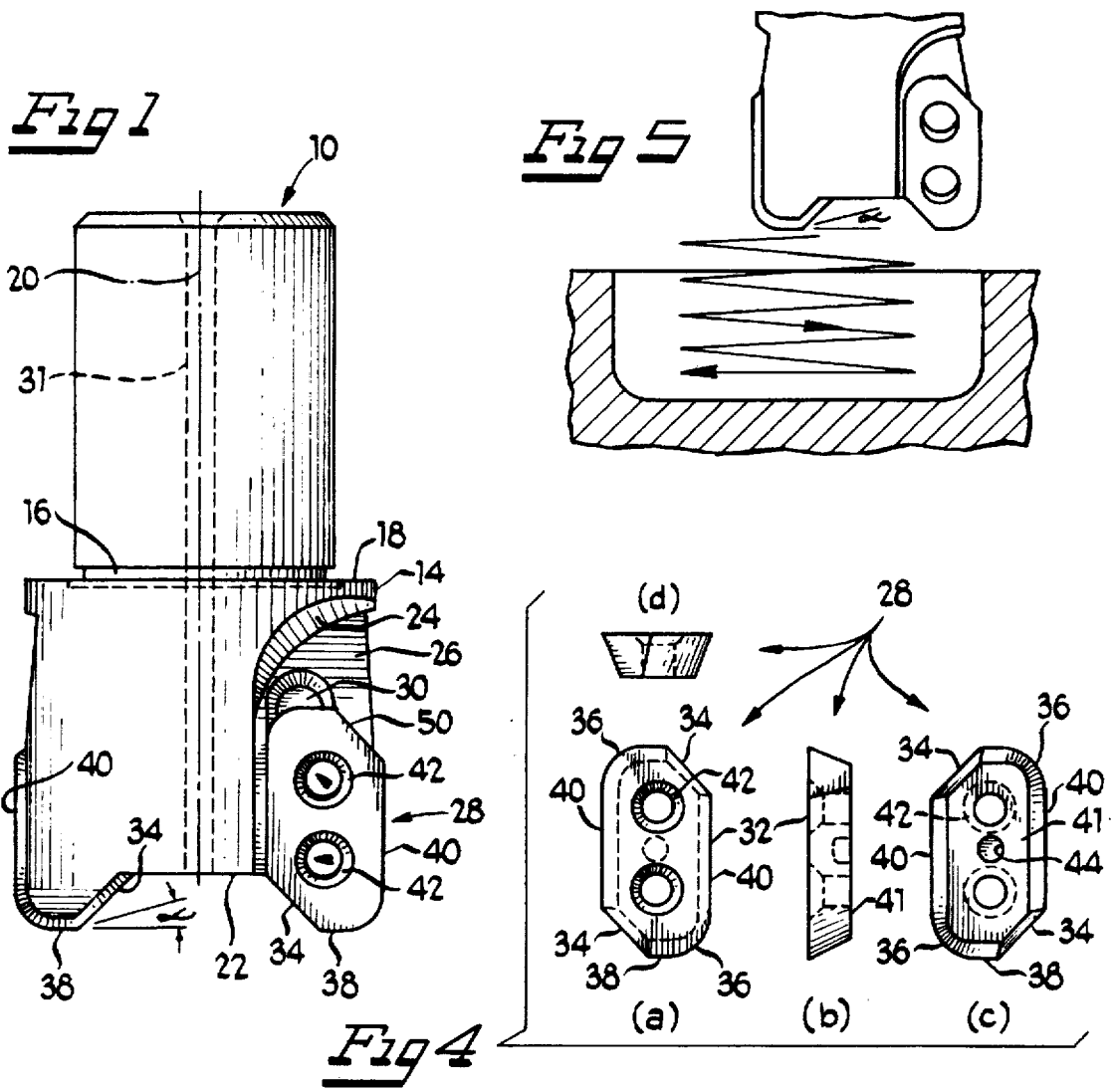
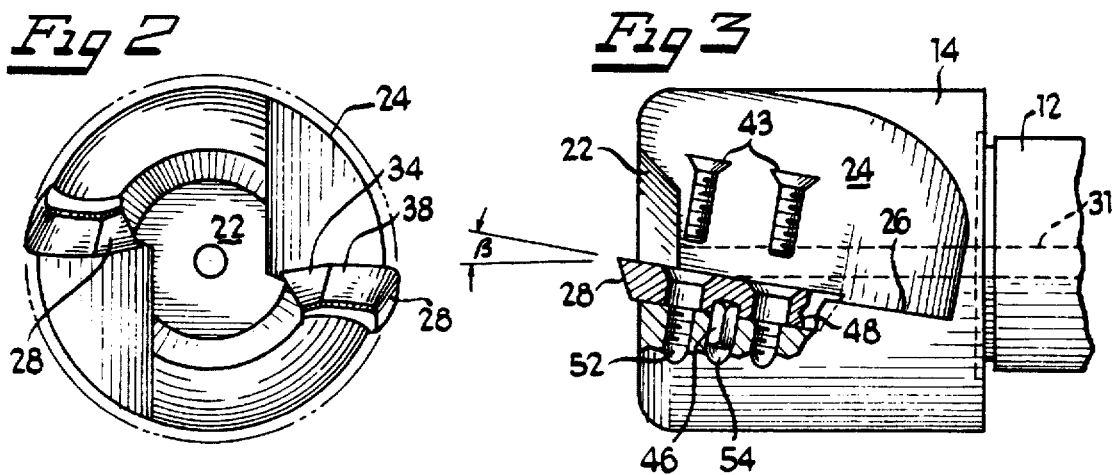

INDEXABLE INSERT ROUTER

This invention relates to routers, and more especially to routers which are, in effect, high-speed end mills of high-metal removal capability such as are used to manufacture integral skeletal frames for aircraft components from plates or slabs of aluminum alloy by milling.

BACKGROUND OF THE INVENTION

In this demanding service, where tooling is pushed to its limits, a 2-inch router turning at 20,000 r.p.m. will be pushed to feed rates to extract the maximum power available from the spindle, in some instances at feed rates up to 400 inches per minute when using machine spindles capable of 100 HP.

The high metal removal rates and the high centrifugal forces encountered do not in themselves constitute the most rigorous aspect of such high speed milling, which occurs rather on plunging entry into the workpiece by ramping, of which such tools must be capable. That is, the tool must be capable of entering the workpiece by axial penetration of its surface without prior preparation of the workpiece by drilling. This is accomplished by feeding the rotating tool both axially and laterally, either simultaneously or alternately in repetitive steps, procedures which require a cutting capability of each cutting insert in both radial directions, i.e., outward and inward.

The latter cutting action, utilizing the radially inwardly facing cutting edge of the insert, results in a cutting force reaction on the insert whose radial component is outward, acting additively to centrifugal force without benefit of any offsetting inwardly-directed reaction component from the outwardly-facing cutting edge, which is idle in the half-revolution during which the inwardly facing cutting edge cuts.

If the ramping feed is aggressive, the added load upon the insert retainers can be substantial, increasing the danger of separation of the insert from the tool body at high speed.

To the extent the problem has been recognized by the prior art, it has been met by forming the inserts and the insert pockets of the tool body with integral interengageable projections and recesses respectively, in one instance a keel-like projection on the insert receivable in a kerf milled in the seating surface of the pocket. Such measures however are difficult to control in manufacture, and stress the hard metal projections of the insert in a manner that that material is not best suited to withstand.

It is accordingly the object of this invention to provide a simple, easily manufactured, interlocking reinforcement of the attachment of inserts to high-speed, heavy duty routers, to enable them to withstand not only the high centrifugal forces encountered, but also the added force upon the insert retainers resulting from ramping entry into the work.

BRIEF DESCRIPTION OF THE INVENTION

In routers according to the invention, the plate-like inserts are secured in their respective pockets by two countersink-head retainers engaged with the countersunk surfaces of two through holes of the inserts, and the underside or seating surface of the insert is recessed in the form of a blind hole positioned between the two retainer holes. A mating projection from the seating surface of the insert pocket of the router body seats itself in the recess with clearance such as to engage the wall of the recess when the insert retainers yield under the applied loads, serving to reinforce the retainers only upon their sufficient deflection and without interfering with the proper seating of the insert as it is secured in place by its retainers.

DESCRIPTION OF THE DRAWINGS

The preferred embodiment of the invention is illustrated in the accompanying drawings, of which:

FIG. 1 is an elevational view of the router of the invention;

FIG. 2 is a bottom view of the same;

FIG. 3 is a side view, partially sectioned to show an important feature of the invention;

FIG. 4 is a series of four orthographic views of the indexable cutting insert of the invention, view (a) showing the rake face, view (b) being a side view, view (c) showing the seating face, and view (d) being an end view of the insert; and FIG. 5 is a sectional view of a workpiece in relation to the router of the invention, shown in fragmentary elevation after withdrawal from a depression milled in the workpiece by so-called ramping entry of the rotating tool.

DETAILED DESCRIPTION OF THE PREFERRED EMBODIMENT

The router 10 of the invention in preferred form is shown in its entirety in FIGS. 1, 2, and 3.

The router comprises two integrally connected, essentially cylindrical sections, namely, a drive shank 12 and a cutter head 14. The drive shank is configured for gripping engagement by a so-called HSK adaption fitting, not shown, which is in turn designed for handling and placement into the spindle of a machine head by an automatic tool changer.

For its fit within the adaption, the shank 12 is turned with an undercut 16 at its juncture with the integral cutter head 14 so that the shank can be ground cylindrically true. The facing shoulder 18 of the cutter head is similarly ground flat and truly perpendicular to the axis 20 of the tool, as those surfaces are the locating surfaces of the tool with respect to the aforementioned adaption, and through it to the high speed equipment in which the tool must be dynamically balanced for 20,000 r.p.m. use.

The cutter head 14, in the tool diameter illustrated, is slightly larger in diameter than the shank 12. At its free end, its corner is rounded, and an axial depression 22 in the form of a truncated cone is turned in the end face to provide clearance for the ramping entry of the router into a workpiece at the angle α indicated in FIG. 1 and again in FIG. 5. Diametrically opposed, identical chip gullets 24 are milled in the cutter head so as to provide a flat surface 26 disposed at the desired axial rake angle β of the two cutting inserts 28 which are seated in pockets 30 milled in the flat surface 26 of each chip gullet. Cutting coolant is fed from the machine head spindle to the cutting zone of the router 10 through an axial hole 31 which serves as the fluid conduit.

The sintered hard metal (WC) cutting inserts 28 are shown separately in the four views of group FIG. 4. FIG. 4(a) showing that major face which constitutes the rake face 32 of the insert, which takes the form of an elongated flat plate of generally rectangular plan. Two diagonally opposite corners are removed to provide radially inwardly facing, straight, diagonal cutting edges 34 when mounted in the cutter head 14 as each is indexed in turn to cutting position by turning the insert end for end. The remaining diagonally opposite corners 36 may be radiussed as shown, or left square, as indicated at the lower end of FIG. 4(a), or rounded at greater or lesser radius than that shown, depending upon the requirements of the job.

In any case, the insert 28, in either of its indexed positions, provides minimally the aforementioned inwardly facing cutting edge 34, an endward or bottom cutting edge 38, and a side cutting edge 40, the latter two being joined by the rounded or circular cutting edge 36 in cutting inserts selected for the fillet milling of blind holes or pockets.

The edge surfaces of the insert recede from the cutting edges of the rake face to the smaller but conformable opposite major face 41, which is the seating surface of the insert. The receding edge surfaces of the insert provide clearance behind the cutting edges for the axial and radial feed of the tool, the clearance angle on the diagonal edge surface behind the inwardly facing diagonal cutting edge 34 being less than those behind the other cutting edges to increase its resistance to dislodgement from the upper end of the insert pocket by centrifugal force when in the upper-end, non-cutting position (See FIG. 1).

The insert 28 is molded with two through holes 42 on the long axis of the insert, which are equispaced from the ends of the insert, and countersunk from the rake face 32 to receive a pair of countersink head retaining screws 43. Between the two retaining screw holes 42, and generally on the long axis of the insert, a recess 44 in the form of a blind hole is molded in the seating surface 41 to receive a pin 46 projecting from the complementary seating surface 48 of the insert pocket 30 of the cutting head.

Returning to the cutter head 14, and especially to FIGS. 1 and 3, the insert pocket 30 is milled into the flat surface 26 of the chip gullet 24 so as to conform to the edge or clearance surfaces of the inactive side cutting edge 40 and the inactive diagonal cutting edge 34. As best seen in FIG. 1, the inactive or upper end of the insert fits like a wedge between the conforming edge surfaces of the pocket which engage the side and diagonal clearance surfaces of the insert, the latter surface being restrained against radially outward movement by the peninsular extension 50 of the pocket wall.

The retaining screws 43 are received in tapped holes 52 which are generally or almost perpendicular to the seating surface 48 of the pocket. That is, the retaining screws use the "bent screw" principle of Erkfritz U.S. Pat. No. 3,662,444, which is here incorporated by reference. The axes of the screw holes are canted at approximately 2° in a direction to urge the insert laterally and firmly into engagement with the edge surfaces of the pocket, which properly locate the several cutting edges of the insert. As the countersink head of the screw engages the countersunk surface of the hole in the insert, the shank of the screw bends to maintain the sideward thrust of the insert against the locating walls of the pocket, as well as securing the insert tightly upon the seating surface 48 thereof. The through holes 42 of the insert are purposely molded oversize to accommodate the bending of the screw, all relevant parts being dimensioned to maintain the bending stress on the screws within their elastic limits.

In the case of the screws more remote from the free end of the cutter head, the direction of the lateral thrust is diagonally inwardly and upwardly as shown by the arrow in FIG. 1, so as to wedge the insert more securely between the opposed edge-locator surfaces at the upper end of the pocket. The lateral thrust of the lowermore screw is directed radially inwardly, as also indicated by an arrow.

Between the two screw holes 52 in the cutter head, a hole 54 is drilled and reamed perpendicular to the seating surface 48 of the pocket to receive the pin 46, preferably a roll pin, in a drive fit. The pin 46 is driven from the pocket end of the hole 54 and allowed to protrude so as to seat itself in the depression 44 in the seating surface of the insert, preferably with lateral clearance not exceeding 0.010 inches overall, so as not to interfere with the proper seating of the insert, as described. However, in the event of further yielding of the retaining screws, particularly the lowermore screws, under centrifugal force and under the further radially outward cutting force reaction upon the inwardly-directed, diagonal cutting edge 34 during ramping entry into the workpiece, illustrated diagrammatically in FIG. 5, the pin 46 reinforces the retaining screws in securing the insert in place.

The maximum available ramping angle is illustrated by the angle $\alpha$ in FIGS. 1 and 5. It is the angle made with the cutting plane of the endward cutting edges 38 by a line between the lower and upper ends, respectively, of the straight, inwardly-directed cutting edges 34 of the opposite inserts of the cutter, assuming axially inward feed at a rate calculated to cut to full depth of the inwardly-directed cutting edges. While ramping at a somewhat lesser angle would be prudent to avoid jamming the free end of the cutter head into the work, production milling tends to use cutting tools to maximum capacity.

Ramping entry into the workpiece by helical interpolation is the technique illustrated by FIG. 5. That is to say, the rotational axis of the tool is moved by numerical control in a circular path at a constant axial feed which determines the angle and the pitch of the helical path, illustrated as somewhat less than the maximum ramping angle. Alternatively, the cutter may be advanced axially and incrementally in a plunging cut and then fed laterally to achieve the same result. In either mode of entry, the reaction to the cutting force exerted by the inwardly-directed cutting edge is additive to centrifugal force, making it highly desirable to reinforce the retaining screws in securing the inserts in the insert pockets at high speeds and cutting loads while ramping.

To that end, the interfitting projecting pin 46 and mating recess 44 in the seating surface of the cutting insert are provided in accordance with the invention.

It will be understood that while the invention has been illustrated in its application to a router having two diametrically opposed chip-gullets and insert seats, it is applicable a well to routers of any number of inserts equally distributed about the periphery, or with other appropriate measures taken for the dynamic balance of the tool.

Further, although the countersink head screw, used in the fashion of the aforementioned Erkfritz patent, to secure the inserts in their pockets is preferred for its simplicity, other countersink head retainers are known which can provide similarly-directed lateral as well as normal force securing the insert in its pocket.

While a drive-fit roll pin is the presently preferred form of projection from the seating surface of the insert pocket to reinforce the insert retainers, other devices, such as headed screws, set screws, and dowel pins may reasonably suggest themselves as alternatives. Similarly, while the recess 44 in the underside of the insert is shown as a round hole, other forms of depression are functionally equivalent if they present radially opposed walls for solid engagement by the projection from the seating surface under operating conditions in both indexed positions of the insert. Forms of depression suffering least distortion from sintering, and having relative freedom from stress concentration, are preferred.

The features of the invention believed new and patentable are set forth in the following claims.

What is claimed is:

1. A router for high-speed milling of aluminum alloys to produce integral skeletal structures from a slab-stock workpiece, having:

a generally cylindrical rotatable cutter head having a generally conical axial recess at its free end and multiple chip flutes equally distributed about the periphery of said cutter head, each flute having a flat surface facing in one direction of rotation of the cutter head and milled to provide therein a pocket having a seating surface and seated thereon a replaceable and indexable plate-like hard metal cutting insert;

said insert having a generally rectangular outline elongated in the axial direction of the cutter head and having opposed rake and seating surfaces, said rake surface being circumscribed by cutting edges including opposed side cutting edges and opposed end cutting edges, each side cutting edge merging with an end cutting edge which extends generally radially of the cutter head and occupies the radially outer portion of the end of the insert presented for cutting;

the remaining portion of each end edge of the insert as presented for cutting receding diagonally from its associated end cutting edge toward the rotational axis of the cutter head generally in conformity to the cross-section of said recess to present a radially inwardly-directed cutting edge intersecting the other of said opposed side cutting edges;

said insert having edge surfaces which recede inwardly of the insert from said cutting edges to said seating surface as clearance surfaces for said cutting edges, and being indexable end-for-end in the plane of the insert;

said insert at its end opposite said presented end being engaged along the clearance surface of the adjacent diagonal cutting edge and along its side edge surface opposite its presented side cutting edge by conforming walls of its associated pocket rising from the seating surface thereof to receive said opposite end of the insert as a wedge between said conforming walls;

said insert having two longitudinally-spaced holes centered between said side cutting edges, spaced equidistantly from the end edges of the insert, extending through the insert between its rake and seating surfaces, and countersunk from the former;

a pair of countersink-headed fasteners positioned in said holes to secure each insert in its pocket;

said insert also having a recess in its seating surface between said two holes in mating registry in both indexed positions with a projection protruding from the seating surface of the pocket;

said projection having a slight lateral clearance in said recess when the insert is secured in said pocket by said fasteners; and said clearance being chosen to bring said projection into side engagement with said recess by the yielding of said fasteners under forces acting radially outwardly upon the insert, to thereby reinforce the fasteners holding the insert in its pocket.

2. The router of claim 1 in which the recess in the seating surface of the insert is a blind round hole and the mating projection from the seating surface of the pocket is a roll pin.

3. The router of claim 2 in which the two fasteners securing the inserts in the cutter head pockets are machine screws canted slightly so as to bend upon engagement with the countersunk surface of the through holes in the inserts, the screws more remote from the free end of the cutter head being canted inwardly and upwardly toward the axis of the cutter head, the remaining screw being canted radially inwardly, and the mating pin having a maximum diametrical clearance of 0.010 inches in said blind hole.

4. An indexable cutting insert for a high-speed end-milling router capable of ramping entry into a workpiece, comprising:

a flat plate of hard metal having an elongated generally rectangular outline defined by cutting edges which circumscribe one major face of said insert which constitutes the rake face thereof in each of two end-for-end indexable positions of the insert;

said cutting edges including opposed side-cutting edges, opposed end cutting edges, and diagonally opposed diagonal cutting edges each contiguous with an end cutting edge and one of the side cutting edges;

said insert having an opposite major face, smaller but conformable in outline to said rake face, and serving as the seating surface of the insert;

all edge surfaces of said insert converging from said rake face to said seating surface and serving as clearance surfaces for said respective cutting edges;

a pair of spaced holes passing through said insert between its major faces and countersunk from said rake face, said holes each being positioned on the longitudinal centerline of the insert and each equidistant from an end of the insert; and said insert also having in its seating surface a recess positioned midway between said through holes on said longitudinal centerline for mating reception of a projection from a receiving surface of a host router.

5. The insert of claim 4 wherein said recess is round.

6. The insert of claim 4 wherein said rake face at the intersection of adjacent end- and side-cutting edges is rounded off, and said seating surface similarly, to provide an interconnecting fillet-cutting edge between said adjacent end- and side-cutting edges.

* * * * *